(12) United States Patent
Bidare

(10) Patent No.: US 6,467,847 B2
(45) Date of Patent: Oct. 22, 2002

(54) COMFORT ARMREST WITH MEMORY

(75) Inventor: Srinivas Bidare, Novi, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/766,512

(22) Filed: Jan. 19, 2001

(65) Prior Publication Data

US 2002/0096928 A1 Jul. 25, 2002

(51) Int. Cl.[7] .............................. B60N 2/46; A47C 7/54
(52) U.S. Cl. ........................ 297/411.32; 297/411.35; 297/411.38; 297/411.3
(58) Field of Search ........................ 297/411.32, 411.3, 297/411.35, 411.38

(56) References Cited

U.S. PATENT DOCUMENTS

| | | |
|---|---|---|
| 2,134,135 A | 10/1938 | LeFevre |
| 3,168,346 A | 2/1965 | Rei, Jr. |
| 3,779,600 A | 12/1973 | Quakenbush |
| 3,807,799 A * | 4/1974 | Freedman ............... 297/411.32 |
| 4,176,878 A | 12/1979 | Koutsky |
| 4,230,414 A * | 10/1980 | Cheshire ............. 297/411.32 X |
| 4,310,196 A * | 1/1982 | Vogel ..................... 297/411.32 |
| 4,313,638 A | 2/1982 | Roper |
| 4,466,664 A | 8/1984 | Kondou |
| 4,496,190 A | 1/1985 | Barley ................ 297/411.32 X |
| 4,621,864 A * | 11/1986 | Hill ..................... 297/411.38 X |
| 4,655,501 A * | 4/1987 | Ishigami et al. .... 297/411.32 X |
| 4,674,790 A | 6/1987 | Johnson |
| 4,886,317 A | 12/1989 | Konzmann et al. |
| 4,902,072 A | 2/1990 | Chancellor, Jr. |
| 4,946,226 A | 8/1990 | Hurn et al. |
| 4,968,095 A | 11/1990 | Moyer |
| 4,978,170 A | 12/1990 | Pelz et al. |
| 4,978,171 A * | 12/1990 | Tateyama .......... 297/411.32 X |
| 5,033,792 A * | 7/1991 | Kanazawa ............. 297/411.32 |
| 5,042,877 A | 8/1991 | Yakota |
| 5,044,691 A | 9/1991 | Guichon |
| 5,076,645 A * | 12/1991 | Yokota ................. 297/411.32 |
| 5,246,267 A | 9/1993 | Nagashima et al. 297/411.32 X |
| 5,342,115 A | 8/1994 | De Filippo ............ 297/411.32 |
| 5,702,157 A * | 12/1997 | Hurite ............... 297/411.32 X |
| 5,934,756 A | 8/1999 | Smith .................... 297/411.32 |
| 5,964,505 A | 10/1999 | Koenig et al. |
| 5,984,416 A | 11/1999 | Waldo et al. .......... 297/411.38 |
| 6,050,645 A | 4/2000 | Bradbury ............... 297/411.38 |

* cited by examiner

Primary Examiner—Rodney B. White
(74) Attorney, Agent, or Firm—Foley & Lardner

(57) ABSTRACT

An automobile comfort armrest having a mounting shaft and a mechanical adjustment mechanism located between the two ends of the armrest is disclosed. The adjustment mechanism includes an adjustment button, an adjustment rod, a sector, a cam, and a pawl. The sector contains gear teeth, an adjustment slot, a stowing notch, and a release ramp to permit retrieval of the comfort armrest from its stowed position. The cam contains a peripheral raised portion, a biasing adjustment nodule, a pawl release ramp to assist the armrest in retreating to its stowed position, and an adjustment rod slot to allow the user to mechanically adjust the position of the armrest. The pawl contains an end with teeth to mesh with the sector teeth and an end with a pointed hook to fit into the notch located in the sector to facilitate a downward stowing position. The mounting shaft contains two end slots at ninety degree angles with a rounded, protruding corner at their intersection to accompany a mounting bracket pin installed in the mounting shaft. The mounting shaft passes through the mounting bracket while the mounting shaft pin locates in the mounting shaft slots. The mounting shaft is then biased against a flat washer and a biasing washer to firmly secure the comfort armrest in place without the use of tools, yet permit its adjustment. The comfort armrest will approximately adjust within a variable number of degrees of its horizontal position and the mechanical adjustment mechanism will memorize the position and return the armrest to the memorized position, even after being retrieved from its downward, stowed position.

27 Claims, 4 Drawing Sheets

COMFORT ARMREST WITH MEMORY

TECHNICAL FIELD OF THE INVENTION

This invention generally relates to an automobile armrest. More specifically, this invention relates to a comfort armrest having a memory feature to restore the armrest to its previously set position after the armrest has been stowed in a downward position.

BACKGROUND

Interior armrests have been used on automobiles for years. Automobile armrests are employed on the inner panels automobile doors and automobile seat backs. While armrests usually accompany bucket style seats, they may be employed on a variety of seat style. While many of these armrests accommodate basic seat occupant needs, that is, to provide an occupant with the area to rest his or her arms, many armrests do not provide advantageous options with respect to armrest positioning and stowing. The armrest devices of the current techniques in the art primarily use an armrest that attaches to the seat back side using bolts, pins or other fasteners, usually installed from an armrest side, through the armrest and into the seat back frame. These armrest devices are usually capable of rotating in a downward arc, from an upward, stowed position, to a horizontal, in-use position. While this current state of the art is functional, it is inefficient for the seat occupant who desires the ability to retrieve an armrest from the stowed position and quickly return it to its previously set position. In essence, no prior art mechanical armrests possess the ability to be retrieved from a downward stowed position and be placed in previously "memorized" position simply by rotating the armrest. Additionally, the current state of the art is such that most armrests are stowed in an upright position, parallel to the seat back. This upright position is often a nuisance to a front or rear seat occupant who desires to look to the rear or front of the vehicle, respectively, or pass items between the front and rear areas. In essence, an upward stowed location utilizes valuable space of the seat occupants. Furthermore, stowing an armrest in a downward position makes retrieval by the seat occupant much simpler and safer than an upward stowed armrest which may require the occupant to reach with his or her arm that is furthermost from the armrest, or move his or her body more than necessary to retrieve the upward stowed armrest. This is especially safer for the automobile driver who may concentrate more on driving than armrest positioning.

To further improve upon the armrest, the comfort armrest discloses a mounting shaft with a mounting slot that permits the pressing of the armrest into the seat back frame to lock the armrest into its functional position. This armrest mounting shaft permits a quick armrest fastening to the seat back frame with a limited amount of parts, with no tools and after the armrest has been fully trimmed.

What is needed then is an armrest that does not suffer from the above limitations. This in turn, will provide an adjustable armrest, capable of being stowed in a downward position and capable of being returned to its previously set "memory" position by simply rotating the armrest upward until it automatically stops to rest in the prior, previously set position. Furthermore, an armrest is provided that is capable of quickly being mounted into the seat back frame without the use of tools, separate fasteners or trim elements to cover the fasteners. It is, therefore, an object of the present invention to provide an armrest that achieves the above-identified advantages.

SUMMARY OF THE INVENTION

Accordingly, this invention provides for a comfort armrest that overcomes the problems and limitations of the conventional techniques in the art. The invention provides for a comfort armrest containing an adjustment mechanism comprised of an armrest button, an adjustment rod, a sector, a cam and a pawl to selectively adjust the armrest to the desired location. The locations selectable by the user of the comfort armrest are approximately plus or minus twenty degrees from a horizontal position.

Briefly, the invention provides for a comfort armrest adjustment mechanism that includes an adjustment rod and associated armrest button. Additionally, the adjustment mechanism includes a sector with a segment of peripheral teeth, a curved slot at a radial distance in close proximity to the perimeter of the sector, and a sector stow notch. Additionally, a spring biased, center pivoting pawl with two functional ends is include as part of the adjustment mechanism. One end of the pawl is used to engage the peripheral sector teeth which achieves the desired armrest positions and a second, tapered end comprises a pointed stow hook to engage the sector stow notch and permit armrest locking in a downward, stowed position. Furthermore, the adjustment mechanism contains a cam governing pawl travel about the sector periphery causing the armrest to stop rotating at its most recently memorized position. Additionally, the cam has a biasing member with a rounded index tooth to engage the sector's angled peripheral teeth. This engagement keeps the cam from moving when the armrest is lifted and the pawl is deflected upward by an angled cam portion, thereby suspending the pawl above the teeth. Disengaging the pawl with the teeth permits the armrest to rotate downward to a stowed and locked position through the engagement of the pawl's pointed stow hook with the sector stow notch.

BRIEF DESCRIPTION OF THE DRAWINGS

Further invention features and advantages will become apparent from the following discussion and accompanying drawings, in which.

DETAILED DESCRIPTION OF THE PREFERRED EMBODIMENT

The following description of the preferred embodiment is merely exemplary in nature and is in no way intended to limit the invention or its application or uses.

Figure 1:
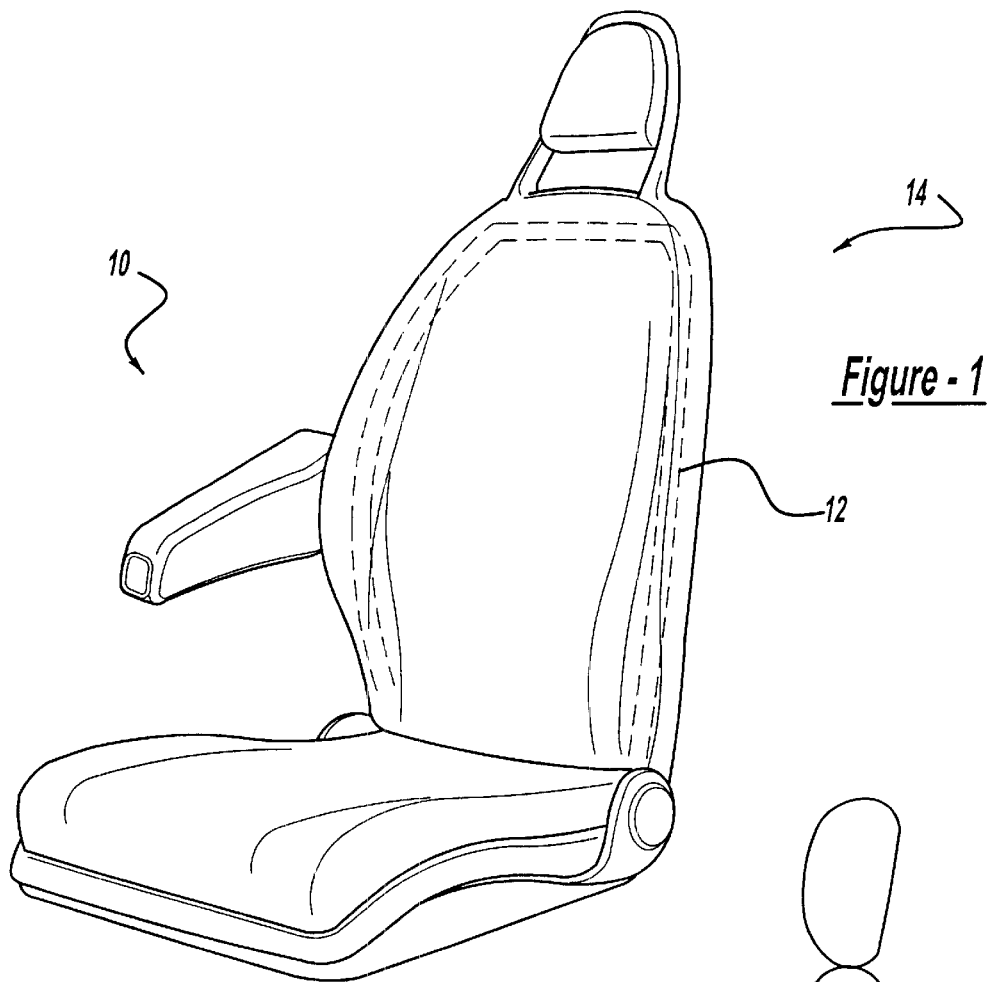
FIG. 1 is a view of a comfort armrest showing its attachment to a seat back frame, shown in phantom.
Figure 2:
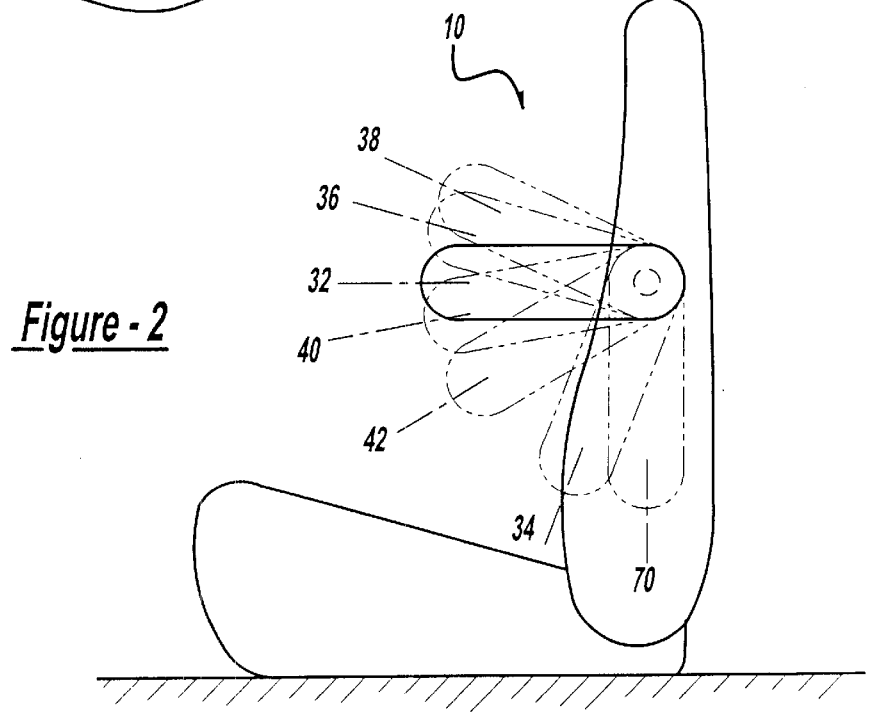
FIG. 2 is a view of the comfort armrest and its range of motion showing representative armrest positions.
Figure 3:
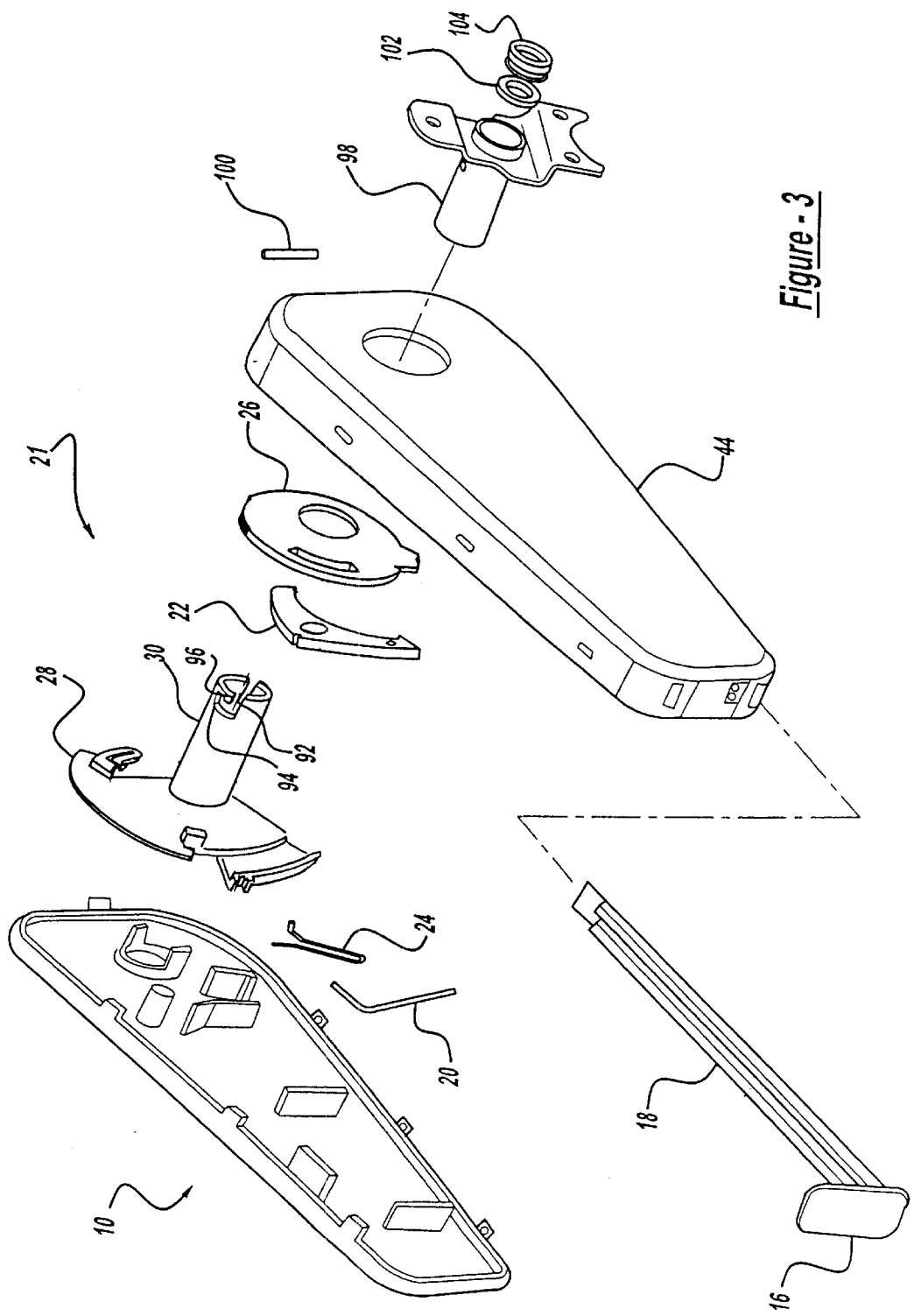
FIG. 3 is an assembly view of the comfort armrest showing the internal adjustment mechanism the armrest mounting shaft and the armrest mounting bracket.
Figure 4:
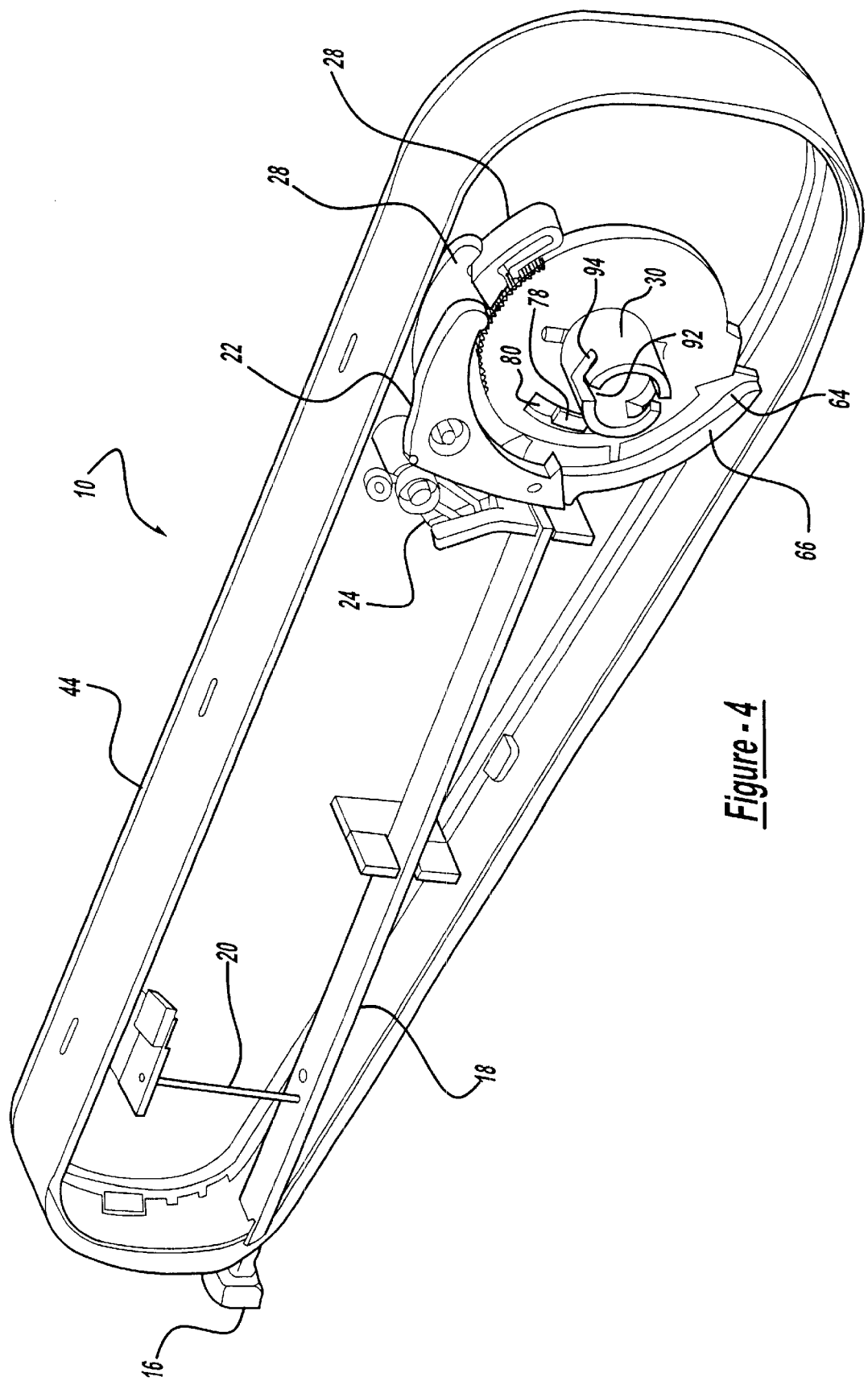
FIG. 4 is a perspective view of the assembled condition of the internal adjustment mechanism of the comfort armrest.
Figure 5:
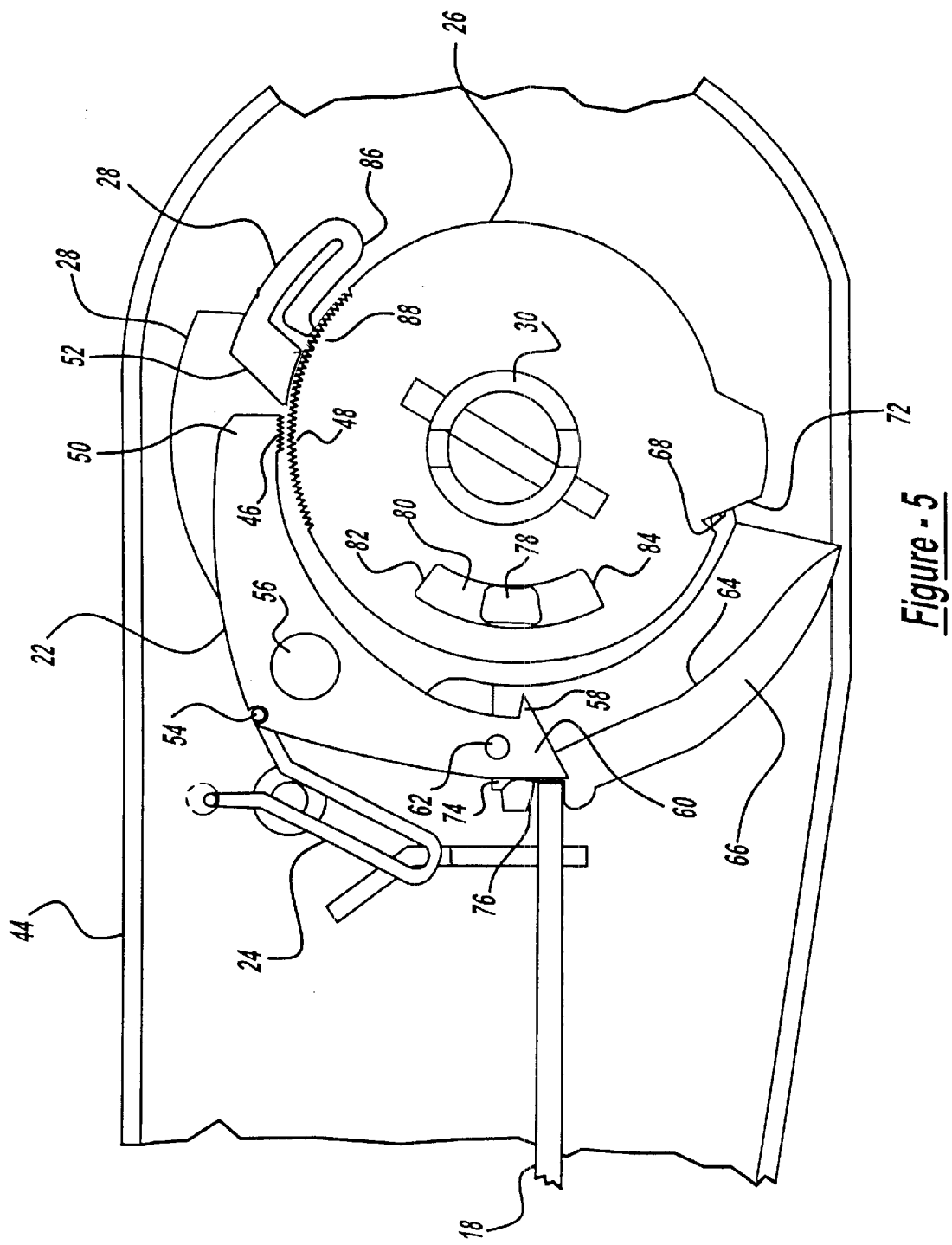
FIG. 5 is an enlarged view of the comfort armrest internal adjustment mechanism.

As shown in FIG. 1, the comfort armrest 10 is attached to an automobile seat back frame 12 of an automobile seat assembly 14 of the preferred embodiment of the present invention. FIG. 2 shows the various comfort armrest positions with reference to an automobile seat. FIGS. 3 through 5 will assist in showing the comfort armrest 10 which includes an adjustment mechanism, shown having an adjustment button 16 attached to an adjustment rod 18 which is biased by a rod spring 20. The adjustment rod 18 is the initiating member of an actuation mechanism 21 which is comprised of a pawl 22, a pawl spring 24, a sector 26, and a cam 28 which function about a mounting shaft 30 of the comfort armrest 10.

The comfort armrest 10 has three primary features. The first feature, illustrate in FIG. 2, is the ability of the comfort armrest 10 to be adjusted to operative positions such as 36, 40 and 42, all capable of being memory positions, within a variable number of degrees from horizontal position 32. In an exemplary embodiment, the comfort armrest 10 may be set to memory positions in two degree increments within plus or minus twenty degrees from the horizontal position 32. The second feature is its ability to be stowed into a downward position 34 with the capability of being returned to its previous memory setting by simply rotating the comfort armrest 10. The third feature is the ability of the comfort armrest 10 to quickly and easily be attached and detached from the seat back frame 12 without tools, external fasteners, or supplementary trim pieces to cover any external fasteners.

In order to stow the comfort armrest 10 from one of its memorized comfort positions, the comfort armrest 10 is rotated upwardly from its memorized position to a memory release position, for example position 38 on FIG. 2.

Referring to FIG. 5, the pawl 22 is fastened to an armrest shell 44, so the pawl 22 will rotate along the periphery of the cam 28 as the armrest is lifted, until pawl teeth 46 lift from sector teeth 48 on the periphery of sector 26. The pawl teeth 46 are located at a pawl first end 50 and are angled in accordance with sector teeth 48 to permit the pawl 22 to disengage the sector 26 after the pawl 22 makes contact with a cam ramp 52. The cam ramp 52 causes the pawl 22, with the force of a pawl spring 24, which rests in a pawl spring notch 54, to rotate over center about a pawl pivot point 56 causing a pointed pawl hook 58 at a pawl second end 60 to be thrust onto the smooth periphery of the sector 26. A downward armrest rotation then causes the pointed pawl hook 58 to slide against the smooth periphery of the sector 26 until the pointed pawl hook 58 lodges in a sector stow notch 68. When the comfort armrest 10 latches in the stow position 34, it will be below the horizontal position 32 as FIG. 2 shows. In an exemplary embodiment, the stow position 34 is about sixty-seven degrees below the horizontal position 32.

Referring to FIGS. 2, 4, and 5, in order to retrieve the comfort armrest 10 from its stow position 34, the comfort armrest 10 is simply rotated approximately 10 degrees further in a downward position to a stow release position 70, as shown in FIG. 2. This causes the pawl second end 60 to make contact with a sector angle portion 72 so the pawl 22 lifts and pivots about the pawl pivot point 56 causing the pawl 22 to rotate over center about the pawl pivot point 56. However, to prevent the pawl teeth 46 from making any contact with the sector teeth 48, the pawl pin 62 makes contact with an inside diameter 64 of a raised peripheral portion 66 of the cam 28. As the comfort armrest 10 is then rotated upward, a pawl pin 62 slides along the inside diameter 64 of the raised peripheral portion 66 until the pawl pin 62, still biased into the raised peripheral portion 66, reaches an upper end 74 or the raised peripheral portion 66, and slides from the raised peripheral portion 64, causing the pawl teeth 46 to engage the sector teeth 48 in precisely the previously memorized position as the pawl 22 biases into the sector 26 thus locking the comfort armrest 10 in the memorized position.

Referring to FIGS. 4 and 5, to set a new comfort position, the adjustment button 16 is depressed and held in a depressed position to activate the adjustment rod 18 which causes two events. The first event occurs when the adjustment rod 18 makes contact with the pawl 22 causing the pawl 22 to pivot about the pawl pivot point 56 which causes the pawl teeth 46 to lift from the sector teeth 48 without allowing the pawl 22 to rotate over center. If the pawl 22 were further rotated in the same direction it would rotate over center, but it is prevented from rotating over center because a cam notch 76 is of a prescribed depth that prevents the adjustment rod 18 from further engaging the pawl 22, which prevents the pawl 22 from rotating to an over center position. By continuing the rotation of the comfort armrest 10 with the adjustment button 16 depressed and the engagement of the adjustment rod 18 with the cam notch 76, the cam 28 rotates in concert through the same number of degrees as the comfort armrest 10 so that the cam 28 moves to a new location with the comfort armrest 10.

The cam 28 movement is also governed as a cam tab 78 moves within a sector slot 80 while setting a new comfort position. As the adjustment button 16 is depressed and held, the cam 28 will stop rotating with respect to the sector 26 if the comfort armrest 10 is rotated enough to cause the engagement of the cam tab 78 with either a first or a second sector slot boundary (82, 84).

A cam spring portion 86 with a rounded indexing tooth 88 indexes along the sector teeth 48 while setting a new comfort position. When the adjustment button 16 is released, the new position is memorized by the cam 28 through the repositioning of cam ramp 52 on the sector teeth 48. The position of the cam 28 regulates the position at which the pawl teeth 46 drop into engagement with the sector teeth 48 when the comfort armrest 10 is returned from its stowed position 70. The memory position is secured by the rounded index tooth 88.

While the comfort armrest 10 enjoys advantages related to memory positioning and stowing, it also hosts advantages related to the installation and removal associated with the seat back frame 12. Features related to the installation and removal of the comfort armrest 10 are best viewed in FIG. 3. The comfort armrest 10 contains a mounting shaft 30 with a mounting shaft slot 92 that is parallel to the axis of the mounting shaft 30. The mounting shaft 30 also contains a cross slot 94 that perpendicularly intersects the mounting shaft slot 92. At the perpendicular intersection of the mounting shaft slot 92 and the cross slot 94 is a mounting shaft slot ridge 96.

The automobile seat back frame 12 contains a mounting bracket 98, a mounting shaft pin 100, a mounting bracket washer 102 and a mounting bracket spring 104 to accept the mounting shaft 30. When the mounting shaft 30 is inserted into the mounting bracket 98, the mounting shaft pin 100 rests within the mounting shaft 30 and secures into the mounting shaft slot 92. At the instant the comfort armrest 10 is being rotated by an installer to negotiate the mounting shaft pin 100 into the cross slot 94, the mounting shaft 30 makes contact with the mounting bracket washer 102 and the mounting bracket spring 104 which biases, requiring a force to complete the insertion. The comfort armrest 10 is inserted into the seat back frame 12 with enough force to cause the mounting shaft 30 to bear against the mounting bracket washer 102 and the mounting bracket spring 104 to compress the mounting bracket spring 104 yet permit rotation of the comfort armrest 10 so the mounting shaft pin 100 is biased around the mounting shaft slot ridge 96 which locks the comfort armrest 10 into position. The process can easily and quickly be reversed to remove the comfort armrest 10 from the seat back frame 12 and associated mounting bracket 98, without the use of tools or external fasteners.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. For example, the armrest 10 may be designed to allow the stow position to be upward rather than downward along the seat assembly 14. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. An armrest for a vehicle seat, comprising:
   an armrest shell adapted to be rotatably coupled to the vehicle seat;
   an actuation mechanism coupled to the armrest shell, wherein the actuation mechanism is configured to set a plurality of operative armrest positions;
   an adjustment mechanism operatively connected to the actuation mechanism;
   wherein the armrest shell is rotatable between a downward stowed position and a previously set operative position;
   wherein when the armrest shell is rotated upward from the stowed position, the actuation mechanism locks the armrest shell into the previously set operative position;
   wherein the adjustment mechanism is configured to operate the actuation mechanism such that a new operative armrest position can be set.

2. The armrest of claim 1, wherein the adjustment mechanism includes an adjustment rod and an adjustment button coupled to the adjustment rod.

3. The armrest of claim 1, wherein the armrest shell is unlocked for downward rotation into the stowed position by first rotating the armrest shell in an upward direction to unlock the actuation mechanism.

4. The armrest of claim 1, wherein the adjustment mechanism includes a pawl operatively coupled to a sector and a cam.

5. A comfort armrest assembly that stows in a downward position comprising:
   an armrest including a shell;
   a mounting shaft extending from the shell;
   a mounting bracket configured to slide over the mounting shaft;
   a mounting shaft pin configured to couple the mounting bracket to the mounting shaft;
   a mounting shaft slot to accept the mounting shaft pin;
   a cross slot intersecting the mounting shaft slot to accept the mounting shaft pin; and
   a mounting shaft slot ridge to lock the mounting shaft pin into the cross slot.

6. A comfort armrest assembly comprising:
   an armrest having a first end and a second end, the armrest having a stowed position and an operative position;
   a mounting shaft connected to the second end of the armrest; and
   an adjustment mechanism located between the first and second ends of the armrest, the adjustment mechanism including a pawl operatively coupled to a sector and a cam; the pawl being semi-circular in shape having a first end with gear teeth, and a second, tapered end forming a pointed stow hook, wherein the adjustment mechanism is configured to set a plurality of operative armrest positions;
   wherein the adjustment mechanism sets the operative position for the armrest such that the armrest automatically returns to the same operative position when deployed from the stowed position to the operative position.

7. The comfort armrest assembly of claim 6 wherein the sector has gear teeth to engage the gear teeth of the pawl to adjust the position of the comfort armrest.

8. The comfort armrest assembly of claim 6 wherein the sector has a stow notch to engage the pointed stow hook of the pawl and secure the comfort armrest in the stowed position.

9. A comfort armrest assembly comprising:
   an armrest having a first end and a second end;
   a mounting shaft connected to the second end of the armrest; and
   an adjustment mechanism located between the first and second ends of the armrest, the adjustment mechanism including a pawl operatively coupled to a sector and a cam; the pawl being semi-circular in shape having a first end with gear teeth, and a second, tapered end forming a pointed stow hook;
   wherein the cam contains a biasing member to mesh with the gear teeth of the sector to maintain a memory setting of the comfort armrest.

10. A comfort armrest assembly comprising:
    an armrest having a first end and a second end;
    a mounting shaft connected to the second end of the armrest; and
    an adjustment mechanism located between the first and second ends of the armrest, the adjustment mechanism including a pawl operatively coupled to a sector and a cam; the pawl being semi-circular in shape having a first end with gear teeth, and a second, tapered end forming a pointed stow hook;
    wherein the cam contains a raised peripheral portion on which the pawl pin makes contact while the comfort armrest assembly is being rotated from its stowed position until the comfort armrest is in an armrest memory position.

11. The comfort armrest assembly of claim 6 further comprising a cam tab to move within a sector slot to govern the rotation of the cam.

12. The comfort armrest assembly of claim 6 wherein the cam contains a cam notch to receive an adjustment rod to permit the rotation of the cam about the mounting shaft when the operative position is being set.

13. A comfort armrest assembly comprising:
    an armrest having an adjustment button;
    an adjustment rod connected to the adjustment button, the adjustment rod engaging a cam;
    a pawl that engages the adjustment rod to permit gear teeth on the pawl to engage gear teeth on a sector; and
    a cam having a biasing member to engage the gear teeth on the sector.

14. The comfort armrest assembly of claim 13 wherein the sector has a sector stow notch to accommodate a stow hook on the pawl to lock the comfort armrest in a stowed position.

15. The comfort armrest assembly of claim 13 wherein the sector has gear teeth to mesh with the pawl and the cam.

16. The comfort armrest assembly of claim 13 wherein the sector has a sector body which defines a sector slot to engage a portion of the cam and permit the rotation of the cam to define an armrest comfort position.

17. The comfort armrest assembly of claim 16 wherein the cam has a cam tab to engage the sector slot and govern the position of the sector relative to the cam.

18. The comfort armrest assembly of claim 13 wherein the pawl has a tapered second end forming a pointed stow hook to engage a sector stow notch.

19. The comfort armrest assembly of claim 13 wherein the pawl has a pawl pin to engage a cam and set the position of the comfort armrest.

20. The comfort armrest assembly of claim 19 wherein the cam has a semi-circular shape with a raised peripheral portion with which the pawl pin makes contact to achieve an armrest position.

21. The comfort armrest assembly of claim 20 wherein the cam contains an angled portion to guide the pawl above the sector gear teeth to permit the comfort armrest to adjust.

22. A method of adjusting a comfort armrest assembly comprising:

setting the armrest to one of a plurality of memory positions relative to a horizontal armrest position;

moving the armrest from the memory position to a stowed position; and moving the armrest from the stowed position to the memory position, wherein the armrest automatically returns to the previously set memory position.

23. The method of adjusting a comfort armrest of claim 22 wherein the method further comprises stowing the armrest in a downward and locked position.

24. The method of adjusting a comfort armrest of claim 23 wherein the method further comprises further moving the armrest in the downward, stowed position to release the armrest to return the armrest to the memory position.

25. The method of adjusting a comfort armrest of claim 22 wherein moving the armrest from the memory position to the stowed position is accomplished by lifting the armrest from the memory position to release the armrest and permit the armrest to rotate.

26. The method of adjusting a comfort armrest of claim 22 wherein the method further comprises pressing an adjustment button to set the memory position.

27. The method of adjusting a comfort armrest of claim 22 wherein a pawl engages a sector to set the desire memory position.

* * * * *